United States Patent [19]

Pilson

[11] 4,080,288
[45] Mar. 21, 1978

[54] SYMBIOTIC MEMBRANE SYSTEMS

[76] Inventor: Daniel Pilson, 12669 Sauterne Dr., Creve Coeur, Mo. 63141

[21] Appl. No.: 674,902

[22] Filed: Apr. 8, 1976

[51] Int. Cl.² .......................... C02C 1/02; C02C 5/02
[52] U.S. Cl. .......................................... 210/15; 55/16
[58] Field of Search .................. 210/3, 11, 15, 188, 210/472, 202; 220/216, 227; 55/16

[56] References Cited

U.S. PATENT DOCUMENTS

| | | | |
|---|---|---|---|
| 3,398,088 | 8/1968 | Okey | 210/11 |
| 3,547,306 | 12/1970 | Natterstad | 220/216 |
| 3,651,616 | 3/1972 | Blanchard et al. | 55/16 |
| 3,874,175 | 4/1975 | Winters | 220/216 |

Primary Examiner—Frank A. Spear, Jr.
Assistant Examiner—E. Rollins Cross
Attorney, Agent, or Firm—Lawrence J. Hurst

[57] ABSTRACT

An improved apparatus and process for use in the treatment of organic and inorganic wastes wherein the reactor has a semipermeable membrane positioned between the gas phase and the liquid phase. The semipermeable membrane is selected to control the flow of selected gases and particularly oxygen and nitrogen from the gas phase to the biomass or liquid phase in a ratio greater than 1 part of oxygen to 4 parts of nitrogen. The membrane also controls the flow of carbon dioxide from the liquid phase to the gas phase.

6 Claims, 4 Drawing Figures

SYMBIOTIC MEMBRANE SYSTEMS

BACKGROUND OF THE INVENTION

The subject invention is concerned with the treatment of organic and inorganic waste streams and more particularly to an improved process of operating a system and reactor for treating organic and inorganic wastes.

Municipalities, industry and commercial users have attempted many methods of treating waste streams (i.e. activated sludge, tapered aeration, modified aeration, contact stabilization, step aeration, etc.). However, these systems have not been very efficient in operation, particularly in the operation of the reactor. Difficulty is experienced in effecting and controlling the oxygen transfer from the gas phase to the liquid phase in a reactor and in supplying sufficient oxygen to the system for effective operation.

The prior art in systems treating organic and inorganic wastes generally consist of primary treatment followed by secondary treatment. In very general terms, the primary treatment of waste is a separation of solid settling particles from the liquid phase; secondary treatment consists of taking the primary effluent or the liquid phase of the waste and feeding it to a reactor where the liquid phase (consisting of organic and inorganic waste material) is combined with microorganisms, "activated sludge", into which air or oxygen is injected or diffused to promote the microorganism activity, the biomass is then fed from the reactor to a clarifier where a separation of supernate or clarified liquid is made from the settled activated sludge. The settled activated sludge containing microorganisms is then recycled to the reactor and combined with the incoming primary effluent.

The improvement of the present invention consists of placing a membrane in the reactor between the gas phase and the liquid phase or biomass. The membrane is selected to control the flow of nitrogen and oxygen from the gas phase to the liquid phase or biomass and to control the flow of carbon dioxide from the biomass to the gas phase. By controlling the flow of oxygen and nitrogen through the membrane, an altered or desired atmosphere is established with an increased level of oxygen in contact with the liquid phase thereby permitting increased biological activity and a higher treatment efficiency (i.e., biochemical oxygen demand removal) in the reactor is obtained.

Some of the prior art attempts at introducing oxygen to the liquid phase or utilizing membranes in the treatment system are discussed below.

A type of reactor apparatus is disclosed in U.S. Pat. No. 3,734,850 which is of a general form showing the injection of an oxygen-containing gas to wastewater for aerating the water.

The process and apparatus disclosed in U.S. Pat. No. 3,580,840 is generally directed to the use of a membrane for effecting the separation of contaminated water from the microorganisms. The membrane prevents the microorganisms from passing into the contaminated water while allowing one or more contaminates to be consumed in the microbial metabolism or growth process. Another use of a membrane is shown in U.S. Pat. No. 3,490,590 wherein a selectively permeable membrane is used for separation of liquid carried particles from the liquid.

Another type of process is described in U.S. Pat. Nos. 3,725,258 and 3,547,812 which generally utilize a supply of expensive oxygen rich gas to the reactor in order to increase the biological activity.

Briefly, the present invention is directed to an improved reactor for use in the treatment of organic and inorganic wastes wherein a semipermeable membrane is placed in the reactor between the liquid and gas phase, said membrane being selected to control the flow of oxygen and nitrogen from the gas phase to the liquid phase in a ratio of oxygen to nitrogen greater than 1:4. The membrane also controls the flow of carbon dioxide from the liquid phase to the gas phase. Another aspect of the present invention, is the process of operating a waste treatment system for organic and inorganic wastes wherein the flow of oxygen from the gas phase is controlled to the liquid phase or biomass in a reactor by passage through a membrane between the liquid and gas phase in the reactor. The process will also control the flow of nitrogen from the gas phase to the liquid phase and the flow of carbon dioxide from the liquid phase to the gas phase.

BRIEF DESCRIPTION OF THE DRAWING

In the drawings which illustrate embodiments of the present invention.

DESCRIPTION OF THE PREFERRED EMBODIMENTS

Figure 1:
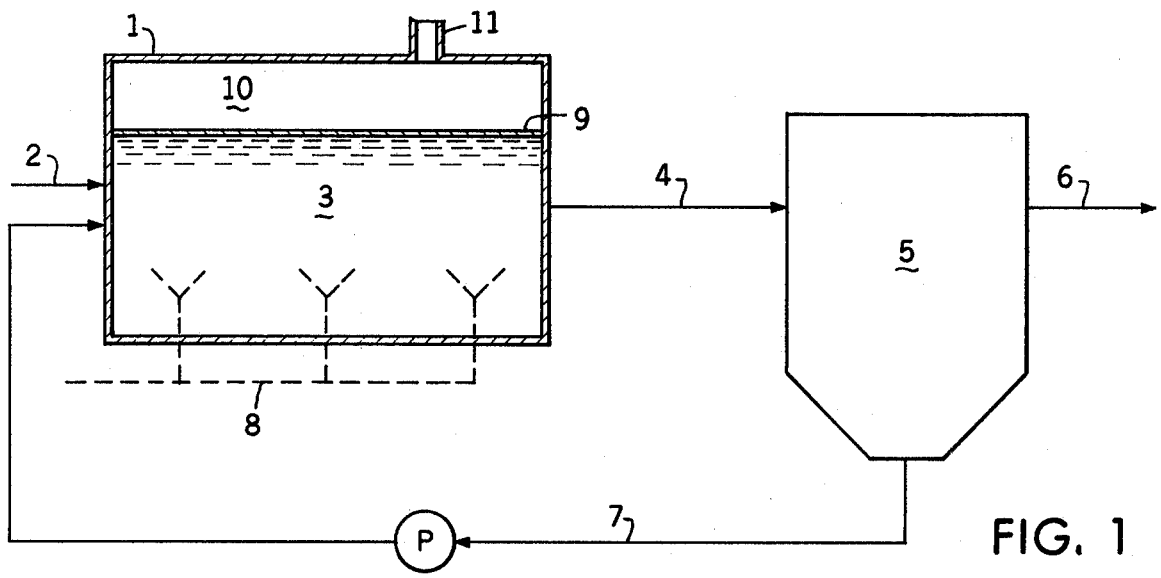
FIG. 1 is a diagrammatic view of a system for treating organic and inorganic wastes having a reactor therein embodying the present invention.

Referring now to FIG. 1, a reactor, indicated generally at 1, is provided with an inlet conduit 2 for delivering the primary effluent or liquid phase of organic and inorganic waste material, indicated generally at 3, from the primary treatment (not shown). An outlet conduit 4 connects the reactor 1 with a clarifier or settler 5. The settler 5 is provided with a discharge conduit 6 for the supernate or clarified effluent and recycle conduit 7 connected to the reactor 1 for discharging the "activated sludge" from the clarifier 5 to the reactor 1. Diffusers, indicated generally at 8, are provided in the bottom of the reactor 1 and are connected to an air or oxygen source (not shown).

A semipermeable membrane 9 is provided in the reactor 1 to separate the liquid phase 3 from the gaseous phase 10 in the reactor. The membrane should be made of a material which will permit the flow of selected gases between the biomass or liquid phase 3 and the gaseous phase 10. The particular type of microorganism activity in the biomass 3 will determine the types of gases that the membrane should control. Of particular concern is the flow of oxygen and nitrogen from the gaseous phase 10 to the liquid phase 3 and control of the flow of carbon dioxide from the liquid phase 3 to the gaseous phase 10. Any membrane material capable of controlling this oxygen, nitrogen, carbon dioxide movement is satisfactory and the membrane may be classified either as semipermeable or microporous and will be referred to herein as semipermeable. As an example, the membranes disclosed in U.S. Pat. Nos. 3,369,343 and 3,651,616 would be suitable. The reactor 1 is also provided with an opening 11 to connect the gaseous phase 10 with the atmosphere or an oxygen source if desired and permits sufficient passages of gases into and out of the gas phase 10 for operation of the reactor. The membrane for most operations should be selected to control the flow of oxygen and nitrogen from the gas phase 10 to the biomass 3 in a ratio of oxygen to nitrogen of 1 part of oxygen to 4 parts of nitrogen or greater levels of oxygen to nitrogen (i.e., greater than 1:4).

In the operation of the system, liquid organic and inorganic wastes are fed through conduit 2 to the reactor 1. The liquid phase or biomass 3 contains the organic and inorganic wastes and a selected quantity of "activated sludge" containing microorganisms. The diffusers 8 are activated to provide air or oxygen to the system. As the biological activity takes place in the liquid phase 3 carbon dioxide is generated and an increased demand for oxygen in the liquid phase occurs. The semipermeable membrane 9 by permitting the flow of oxygen from the gaseous phase 10 to the liquid phase 3 and controlling the flow of carbon dioxide from the liquid phase 3 to the gaseous phase 10 creates an altered or desired atmosphere in contact with the biomass 3 to meet the requirements of the microorganisms during the treatment process and permit an increase in the efficiency of the biological activity in the liquid phase 3. Upon retention of the biomass for a predetermined period of time the liquid phase is fed through the conduit 4 to the clarifier 5 where it is separated into clarified effluent, discharged through conduit 6 and the "activated sludge" discharged through conduit 7 into the reactor 1 with the organic and inorganic wastes fed through conduit 2.

Figure 2:
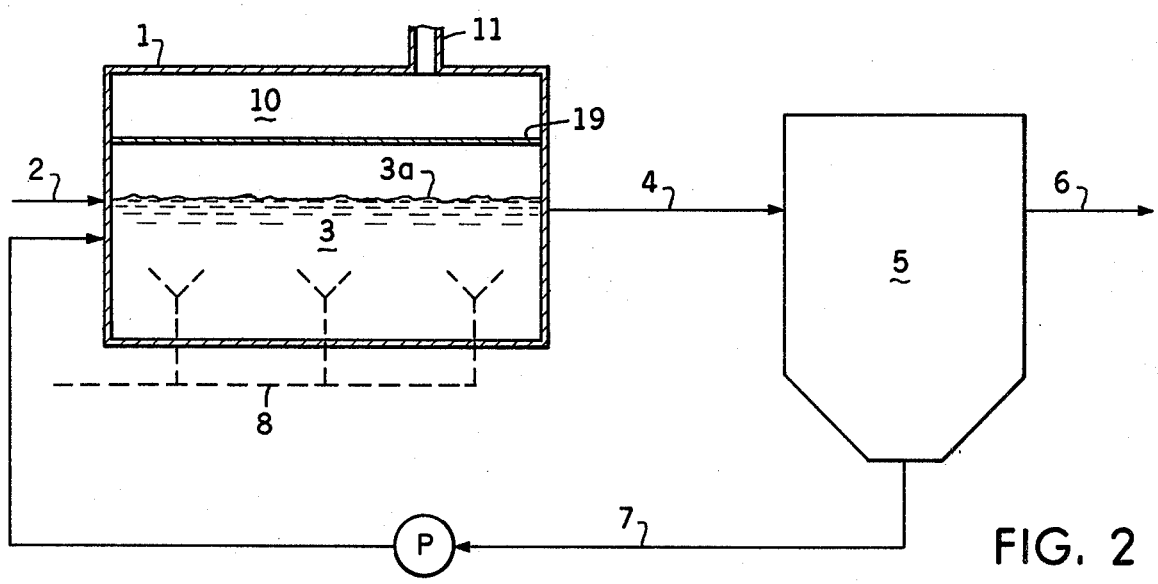
FIG. 2 is a diagrammatic view of a system for treating organic and inorganic wastes having another embodiment of a reactor therein embodying the present invention.

Referring now to FIG. 2, it will be seen that the semipermeable membrane 19 is spaced from the surface 3a of the liquid or biomass 3 in the reactor 1. The spacing is such that clogging or growth of microorganisms on the surface of the membrane is prevented. This permits the use of the same membrane on many different types of treatment systems (i.e., activated sludge, step aeration, modified aeration, etc.). The operation of this alternative embodiment would be the same as the operation of the reactor of FIG. 1, however, the efficiency may be somewhat diminished by the surface tension 3a of the liquid phase 3 preventing the oxygen from being readily supplied to the microorganisms.

Figure 3:
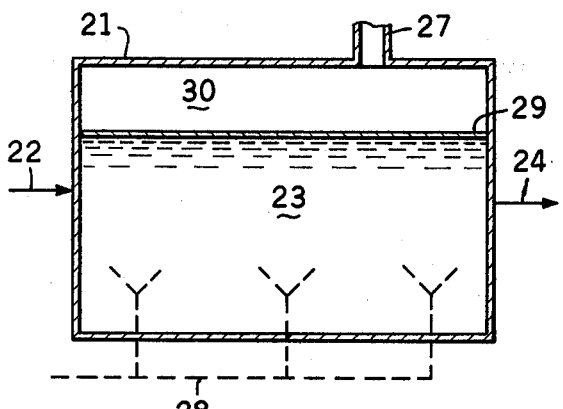
FIG. 3 is a diagrammatic view of another reactor embodying the present invention.

Referring now to FIG. 3, the reactor, indicated generally at 21, is provided with an inlet conduit 22 for delivering the liquid phase of the organic and inorganic wastes and an outlet conduit 24 for removing the treated effluent. A semipermeable membrane 29 is provided in the reactor 21 to separate the liquid or biomass 23 from the gaseous phase 30. Diffusers indicated generally at 28 are provided in the bottom of the reactor 21 and are connected to an air or oxygen source (not shown). The membrane 29 should be of a material to control the flow of selected gases between the gaseous phase 30 and the biomass 23 to create an altered or desired atmosphere suitable for use by the microorganisms during the treatment process. For most operations the membranes should control the flow of oxygen and particularly the flow of oxygen and nitrogen from the gas phase 30 to the biomass 23 in a ratio of oxygen to nitrogen greater than 1:4. This reactor would function in the same manner as described with respect to the system of FIG. 1.

Figure 4:
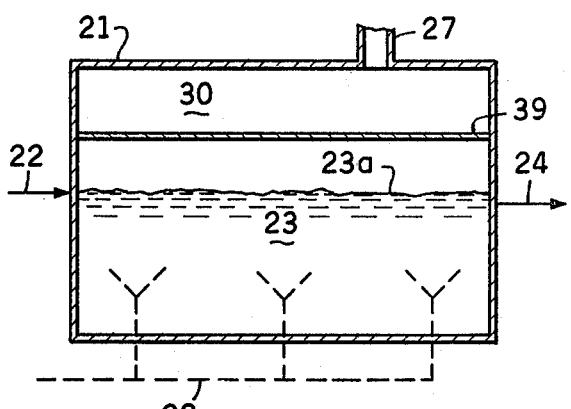
FIG. 4 is a diagrammatic view of another reactor embodying the present invention.

Referring now to FIG. 4, it will be seen that the semipermeable membrane 39 is spaced from the surface 23a of the biomass 23 in the reactor 21. This spacing may be desirable to prevent the growth of microorganisms on the surface of the membrane 39. The operation of this alternative embodiment of the reactor would function substantially in the same manner as the reactor in the system of FIG. 1; however, the efficiency may be somewhat diminished by the surface tension 23a of the liquid phase 23 preventing the oxygen from being readily utilized by the microorganisms.

From the foregoing, it is now apparent that a novel reactor and process for use in treating organic and inorganic wastes meeting the objects set out hereinbefore is provided and that changes or modifications as to the precise configurations, shapes and details of the construction set forth by way of illustration may be made by those skilled in the art without departing from the spirit of the invention, as defined by the claims which follow:

I claim:

1. A process for treating liquid organic and inorganic wastes in a reactor containing a semipermeable membrane separating a liquid biomass from a gaseous phase comprising feeding the liquid waste into the biomass in the reactor, the semipermeable membrane in the reactor being of a material to control the flow of selected gases including at least oxygen and nitrogen between the gaseous phase and the biomass to permit the establishment of a desired atmosphere in contact with the biomass to aid in the biological activity in the biomass, maintaining the desired atmosphere to aid in the biological activity in the biomass, retaining the biomass in contact with the desired atmosphere for a predetermined period of time for sufficient biological activity to occur in the biomass and thereafter removing the treated biomass from the reactor.

2. The process of claim 1 wherein the flow of selected gases from the gaseous phase to the biomass through the membrane has a ratio of oxygen to nitrogen greater than 1:4.

3. The process of claim 2 wherein the flow of selected gases through the membrane controls the flow of carbon dioxide generated by the biological activity in the biomass from the biomass to the gaseous phase.

4. A process for treating liquid organic and inorganic wastes in a reactor containing a semipermeable membrane separating a liquid biomass from a gaseous phase and comprising feeding the liquid waste into the biomass in the reactor, the semipermeable membrane being suspended a predetermined distance above the biomass to establish a spacing for a desired atmospheric gaseous process in contact with the biomass, the semipermeable membrane being of a material to control the flow of selected gases including at least oxygen and nitrogen between the gaseous phase and a desired atmospheric gaseous phase in contact with the biomass to establish the desired atmosphere in the gaseous phase in contact with the biomass, maintaining the semipermeable membrane spaced a determined distance above the liquid biomass to substantially prevent the growth of microorganism on the membrane maintaining the desired atmosphere to aid in the biological activity in the biomass; retaining the biomass in contact with the desired atmosphere for a predetermined period of time for sufficient biological activity to occur in the biomass and thereafter removing the treated biomass from the reactor.

5. The process of claim 4 wherein the flow of selected gases from the gaseous phase to the desired atmosphere gaseous phase through the membrane has a ratio of oxygen to nitrogen greater than 1:4.

6. The process of claim 5 wherein the flow of selected gases generated by the biological activity in the biomass through the membrane controls the flow of carbon dioxide.

* * * * *